US012284737B1

(12) United States Patent
Huang

(10) Patent No.: US 12,284,737 B1
(45) Date of Patent: Apr. 22, 2025

(54) LED STRING LIGHT CONTROLLING METHOD USING POWER LINE COMMUNICATION AND LED STRING LIGHT USING POWER LINE COMMUNICATION

(71) Applicant: POWER MOS ELECTRONICS LIMITED, Kowloon Hongkong (CN)

(72) Inventor: Ping Huang, Shenzhen (CN)

(73) Assignee: POWER MOS ELECTRONICS LIMITED, Kowloon Hongkong (CN)

( * ) Notice: Subject to any disclaimer, the term of this patent is extended or adjusted under 35 U.S.C. 154(b) by 0 days.

(21) Appl. No.: 18/965,150

(22) Filed: Dec. 2, 2024

(51) Int. Cl.

| | |
|---|---|
| ***H05B 45/48*** | (2020.01) |
| ***H05B 47/16*** | (2020.01) |
| ***H05B 47/185*** | (2020.01) |

(52) U.S. Cl.
CPC ............. *H05B 45/48* (2020.01); *H05B 47/16* (2020.01); *H05B 47/185* (2020.01)

(58) Field of Classification Search
CPC ........ H03K 2217/960785; H03K 2217/96079; H05B 47/11; H05B 45/20; H05B 45/10; H05B 47/10; H05B 47/19; H05B 47/18; H05B 47/185; H05B 45/48; H05B 45/44; H01R 13/7175
See application file for complete search history.

(56) References Cited

U.S. PATENT DOCUMENTS

| | | | | |
|---|---|---|---|---|
| 2008/0317475 | A1* | 12/2008 | Pederson | H04Q 11/0003 398/135 |
| 2014/0062339 | A1* | 3/2014 | Wiscombe | H05B 47/185 315/307 |
| 2019/0190519 | A1* | 6/2019 | Monteith | G01J 5/025 |
| 2020/0412070 | A1* | 12/2020 | Owen | H04L 43/16 |
| 2022/0167487 | A1* | 5/2022 | Leizerovich | F21S 8/086 |
| 2023/0420891 | A1* | 12/2023 | Owen | H04L 43/16 |

* cited by examiner

*Primary Examiner* — Monica C King
(74) *Attorney, Agent, or Firm* — Birch, Stewart, Kolasch & Birch, LLP

(57) ABSTRACT

An LED string light controlling method using the PLC is executed by an LED string light using the PLC. The LED string light using the PLC is driven by a time-sharing technique. When a controller unit transmits data segments to an LED unit, an LED module of the LED unit is turned off, such that a current flowing through the LED module can be decreased. Namely, a power line for connecting the LED unit is an unloaded power line, and the data segments can be correctly transmitted. Moreover, an impact of data deformation or distortion caused by a current for driving the LED module can also be minimized. Therefore, a limitation of a transmission distance caused by the PLC can be improved, or an amount of the at least one LED module can be increased.

14 Claims, 7 Drawing Sheets

LED STRING LIGHT CONTROLLING METHOD USING POWER LINE COMMUNICATION AND LED STRING LIGHT USING POWER LINE COMMUNICATION

BACKGROUND OF THE INVENTION

1. Field of the Invention

The present invention relates to a Light Emitting Diode (LED) string light controlling method and an LED string light, and especially an LED string light controlling method using a power line communication (PLC) and an LED string light using the PLC.

2. Description of the Related Art

A conventional smart LED string light includes multiple LED beads electrically connected in series or in parallel. The conventional smart LED string light can emit color lights according to predetermined characters, animations, or patterns. The color lights of the conventional smart LED string light can be controlled according to a PLC. Each of the LED beads has a unique address, and each of the LED beads responds to a controlled signal having a matched address. The controlled signal is transmitted through a power line. Each of the controlled signals includes an address and driver data. Each of the LED beads includes a light module and a smart driver module. The smart driver module can recognize the controlled signal and responds to the controlled signal having the matched address. For example, when the smart driver modules of the LED beads respond to the controlled signals, the smart driver modules control the light modules of the LED beads to emit color lights according to the controlled signals, such that the color lights of the conventional smart LED string light can be changed to display a pattern.

The control signals are transmitted by frames. Each of the frames includes a set of the control signals, and the set of the control signals is generated according to the addresses and the driver data corresponding to the LED beads by a main controller of the conventional smart LED string light. When the main controller generates the set of the control signals of the frames, the main controller further transmits the set of the control signals to the LED beads through the power line. The control signals of one of the frames are continuously transmitted, and the frames do not include any interrupt signals. Namely, based on the PLC, the main controller transmits the set of the control signals of one of the frames each time. A data volume of the set of the control signals of one of the frames correspond to an amount of the LED beads of the conventional smart LED string light. When the amount of the LED beads is greater, the data volume of the set of the control signals of one of the frames is greater. However, since each of the LED beads has a fixed impedance, when a current flowing through the LED beads is floating, the control signals transmitted through the power line are influenced. Therefore, data of the control signals are easily distorted, and the control signals cannot be transmitted correctly over a long distance.

SUMMARY OF THE INVENTION

The present invention provides an LED string light controlling method using a PLC and an LED string light using the PLC.

The LED string light controlling method using the PLC is executed by a controller unit of an LED string light, and includes steps of:

- dividing original data of a frame into multiple data segments;
- generating and transmitting a starting signal to LED units of the LED string light for turning off LED modules of the LED units;
- transmitting a head data segment of the data segments to the LED units for storing matched data of the head data segment into buffer modules of the LED units;
- generating and transmitting a first signal to the LED units for turning on the LED modules.

Moreover, the LED string light using the PLC includes the controller unit and at least one LED unit.

The controller unit includes a memory module, a processor module, and a power module. The memory module stores at least one frame. The processor module is electrically connected to the memory module, and loads the frame stored in the memory module. The power module is electrically connected to the processor module.

The at least one LED unit includes a driver module, a buffer module, and an LED module. The buffer module is electrically connected to the power module. The driver module is electrically connected to the buffer module, and is electrically connected to the processor module through the buffer module and the power module. The LED module is electrically connected to the driver module.

The processor module divides original data of a frame into multiple data segments, and generates and transmits a starting signal to the driver module.

When the driver module receives the starting signal, the driver module enters a frame driving mode, and the driver module turns off the LED module.

After the processor module transmits the starting signal to the driver module, the processor module transmits a head data segment of the data segments to the driver module, and when the driver module receives the head data segment, the driver module determines whether any one of addresses of data in the head data segment is matched.

When any one of the addresses of the data in the head data segment is matched, the driver module stores matched data having matched address into the buffer module.

After the processor module transmits the head data segment of the data segments to the driver module, the processor module generates and transmits a first signal to the driver module, and when the driver module receives the first signal, the driver module turns on the LED module.

The LED string light using the PLC of the present invention is driven by a time-sharing technique. When the processor module of the controller unit transmits the data segments to the driver module of the LED unit, the LED module of the LED unit is turned off, such that a current flowing through the LED module can be decreased. Namely, a power line for connecting the LED unit is similar to an unloaded power line, and the data segments can be correctly transmitted. Moreover, since the power line only needs to maintain a minimum current for driving the driver module of the LED unit, an impact of data deformation or distortion caused by a current for driving loads, such as the LED module, can be minimized. Therefore, a limitation of a transmission distance caused by the PLC can be improved, or an amount of the at least one LED module can be increased.

DETAILED DESCRIPTION OF THE INVENTION

Figure 1:
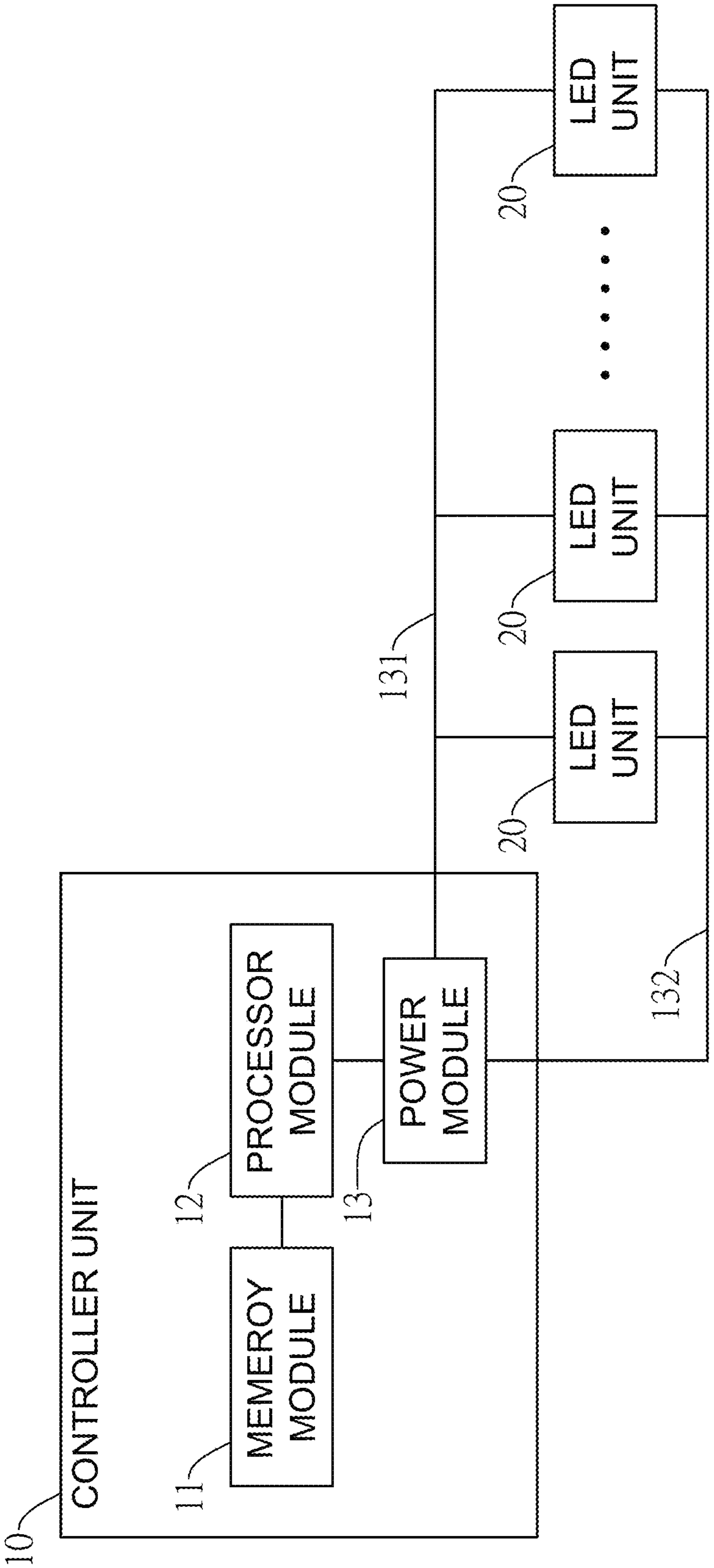
FIG. 1 is a block diagram of an LED string light using a PLC of the present invention.
Figure 2:
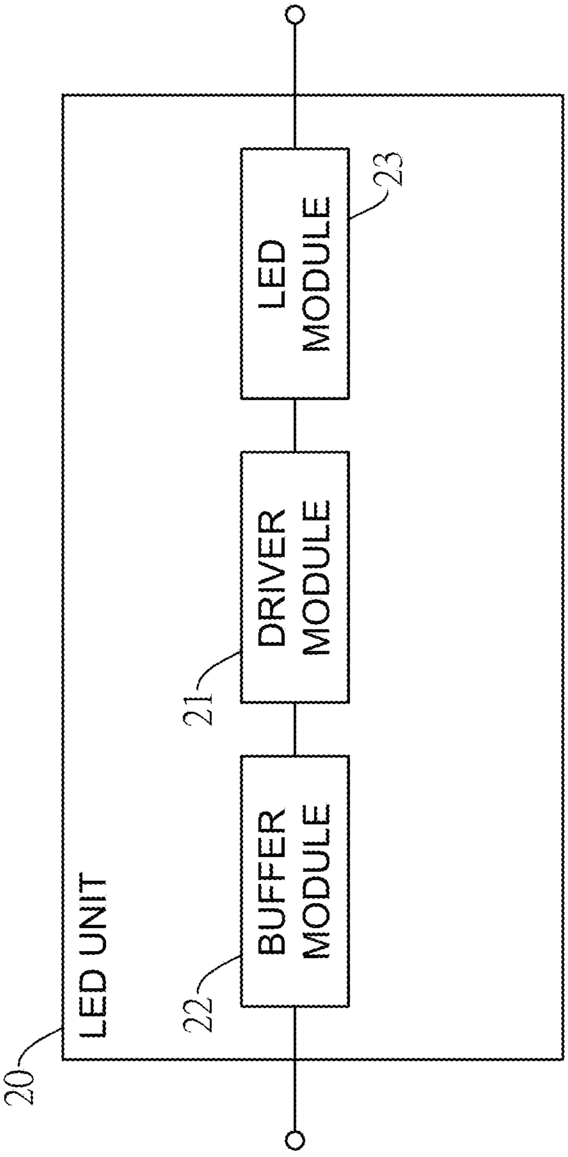
FIG. 2 is a block diagram of an LED unit of the LED string light using the PLC of the present invention.

With reference to FIGS. 1 and 2A-2B, the present invention is an LED string light controlling method using a PLC. The LED string light controlling method is executed by an LED string light using the PLC. The LED string light using the PLC includes a controller unit 10 and at least one LED unit 20.

The controller unit 10 includes a memory module 11, a processor module 12, and a power module 13. The memory module 11 stores at least one frame.

The processor module 12 is electrically connected to the memory module 11, and loads the frame stored in the memory module 12. The power module 13 is electrically connected to the processor module 12.

Further reference to FIGS. 3, and 4A-4C, the at least one LED unit 20 includes a driver module 21, a buffer module 22, and an LED module 23. The buffer module 22 is electrically connected to the power module 13 of the controller unit 10. The driver module 21 is electrically connected to the buffer module 22, and is electrically connected to the processor module 12 of the controller unit 10 through the buffer module 22 and the power module 13. The LED module 23 is electrically connected to the driver module 21. In the embodiment, the power module 13 may be a PLC module for transmitting data and electricity to the at least one LED unit 20.

The processor module 12 divides original data of a frame into multiple data segments, and generates and transmits a starting signal to the driver module 21.

When the driver module 21 receives the starting signal, the driver module 21 enters a frame driving mode, and the driver module 21 turns off the LED module 23. In the embodiment, the driver module 21 turns off the LED module by bypassing the LED module 23.

After the processor module 12 transmits the starting signal to the driver module 21, the processor module 12 transmits a head data segment of the data segments to the driver module 21, and when the driver module 21 receives the head data segment, the driver module 21 determines whether any one of addresses of data in the head data segment is matched.

When any one of the addresses of the data in the head data segment is matched, the driver module 21 stores matched data having matched address into the buffer module 22.

After the processor module 12 transmits the head data segment of the data segments to the driver module, the processor module 12 generates and transmits a first signal to the driver module 21, and when the driver module 21 receives the first signal, the driver module 21 turns on the LED module 23.

When none of the addresses of the data in the head data segment is matched, the driver module 21 passes the head data segment.

The LED string light using the PLC of the present invention divides the original data of the frame into the multiple data segments, such that the data segments can be transmitted at intervals. Based on a time-sharing technique, the data segments can be transmitted at time periods of turning off the LED module 23 of the LED unit 20, and the LED module 23 can be turned on at another time periods of stopping transmitting the data segments. An amount of the data segments can be determined according to an amount of the LED unit 20. Since the data segments are transmitted at the time periods of turning off the LED module 23, a data length of each of the data segments can be determined according to a visual persistence characteristic of human eyes. Therefore, a visual light jitter caused by time-sharing control can be avoided.

Moreover, since the LED string light using the PLC is driven by the time-sharing technique, when the processor module 12 transmits the data segments to the LED module 23, the LED module 23 is turned off. Therefore, a current flowing through the LED module 23 can be decreased. Namely, an impact of data deformation or distortion caused by a current for driving the LED module can be minimized. Therefore, a limitation of a transmission distance caused by the PLC can be improved, or an amount of the at least one LED module can be increased.

Further, after the processor module 12 transmits the first signal to the driver module 21, the processor module 12 waits for a first time period.

After the processor module 12 waits for the first time period, the processor module 12 generates and transmits a second signal to the driver module 21, and when the driver module 21 receives the second signal, the driver module turns off the LED module 23.

After the processor module 12 transmits the second signal to the driver module 21, the processor module 12 transmits a next segment of the data segments to the driver module 21, and when the driver module 21 receives the next segment of the data segments, the driver module 21 determines whether any one of the addresses of data in the next segment is matched.

When any one of the addresses of the data in the next segment is matched, the driver module 21 stores matched data having matched address into the buffer module 22.

After the processor module 12 transmits the next segment of the data segments to the driver module 21, the processor module 12 generates and transmits the first signal to the driver module 21, and when the driver module 21 receives the first signal, the driver module 21 turns on the LED module 22.

After the processor module 12 transmits the second signal to the driver module 21, the processor module 12 determines whether an end data segment of the data segments is transmitted.

When the end data segment of the data segments is transmitted, the processor module 12 transmits a driving signal to the driver module 21, and when the driver module 21 receives the driving signal, the driver module 21 drives the LED module 23 according to the matched data stored in the buffer module 22.

When none of the addresses of the data in the next segment is matched, the driver module 21 passes the next segment.

In the embodiment, when the driver module 21 receives the first signal, the driver module 21 turns on the LED module 22 by driving the LED module 23 according to the matched data stored in the buffer module 22.

Moreover, after the processor module 12 transmits the driving signal to the driver module 21, the processor module 12 waits for a second time period, and further divides original data of a next frame into multiple next data segments for transmitting the data of the next frame. A method for transmitting the data of the next frame is similar with a method for transmitting the data of the frame.

Figure 3:
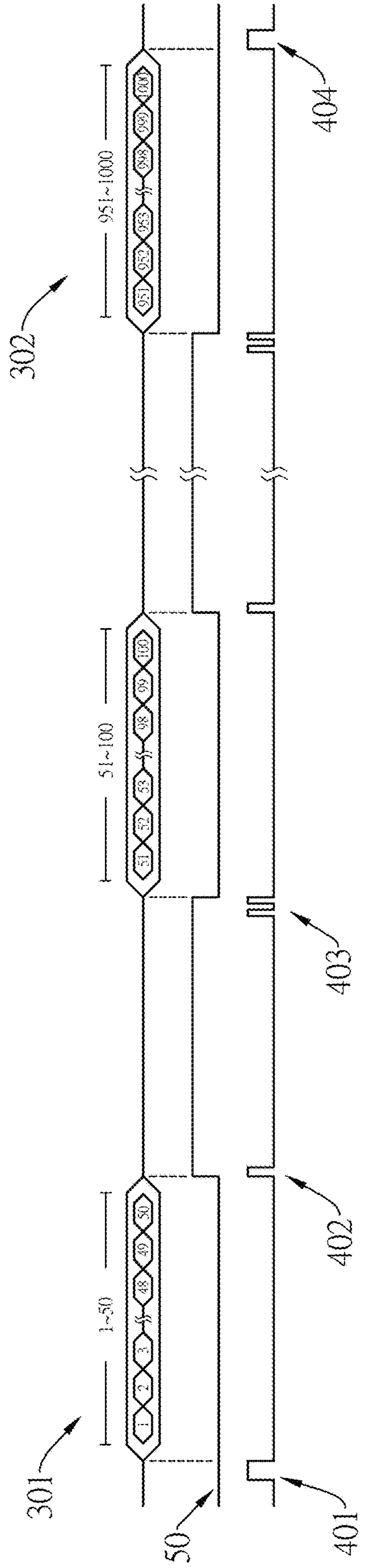
FIG. 3 is a schematic diagram of data segments, light signal, and a control signal of the present invention.

With reference to FIG. 3, for example, the original data of the frame includes data of 1000 LED units 20, and is divided into 20 data segments. The data of the $1^{st}$ LED unit to the 50th LED unit 20 is included in the head data segment 301, the data of the $51^{st}$ LED unit to the 100th LED unit 20 is included in a second data segment, and so on. The data of the $951^{st}$ LED unit to the 1000th LED unit 20 is included in an end data segment 302.

In the embodiment, a time period for turning off the LED modules 23 is equal to a time period for turning on the LED modules 23. Namely, a duty cycle is 50%. In one period, half time of the period is used to receive the data segments, and the other half time of the period is used to display a content of the data of the frame.

When the processor module 12 transmits a control signal to the driver module 23 through the power module 13, the processor modules 12 firstly transmits the starting signal 401 for entering the driver module 21 into the frame driving mode and for turning off the LED modules 23, such as a low voltage level of a light signal 50 shown in FIG. 3. The processor module 12 secondly transmits the head data segment 301 including the data of the $1^{st}$ LED unit to the $50^{th}$ LED unit 20. The processor module 12 thirdly transmits the first signal 402 for turning on the LED modules 23, such as a high voltage level of the light signal 50 shown in FIG. 3. The processor module 12 waits for the first time period, and the processor module 12 fourthly transmits the second signal 403 for turning off the LED modules 23, such as the low voltage level of the light signal shown in FIG. 3, and so on. After the processor module 12 transmits the end data segment including the data of the $951^{st}$ LED unit to the $1000^{th}$ LED unit 20, the processor module 12 transmits the driving signal 404 for driving the LED module 23 according to the matched data stored in the buffer module 22.

In one embodiment, the starting signal, the first signal, the second signal, and the driving signal are Pulse Width Modulation (PWM) signals. A pulse width of the starting signal, the first signal, the second signal, or the driving signal can be modulated differently. The first time period and the second time period can be calculated by a counter inside the driver module 21. The LED modules 23 can be turned on for the preset first time period, and can be automatically turned off after displaying the content of the frame. Then, the driving module 21 can receive the next data segment again. A length of the first time period can be determined according to a data volume of the data segment.

The LED string light using the PLC includes at least one smart LED bead, such as the LED unit 20. The at least one LED unit 20 is connected to the controller unit 10 through a positive power line 131 and a negative power line 132. When the LED string light using the PLC includes multiple LED units 20, the multiple LED units 20 are connected in series or in parallel through the positive power line 131 and the negative power line 132. In one embodiment, the controller unit 10 is a logic processor. The LED string light using the PLC further includes a power carrier and driver. The LED string light using the PLC is connected to a power source for receiving electric power. The driver module 31, the buffer module 32 and the LED module 33 are integrated through a conductive line to form the at least one LED unit 20, such as the LED bead. The LED module 21 may be a Dual In-Line (DIP) LED, or a surface mounted LED. The controller unit 10 transmits the control signal to the at least one LED unit 20 through the PLC technique, such that the at least one LED unit 20 can receive the control signal through the positive power line 131 and the negative power line 132. The at least one LED unit 20 may further respond to the data including the matched address. Therefore, the controller unit 10 can transmit the control signal to the at least one LED unit 20 having the matched address, and the LED string light using the PLC can display preset visual effects.

In one embodiment, the LED beads having multiple colors include at least one red color LED bead, at least one green color LED bead, at least one blue color LED bead, and at least one white color LED bead.

In another embodiment, the LED beads having multiple colors include at least one red color LED bead, at least one green color LED bead, and at least one blue color LED bead.

In an embodiment, the data segments include at least one color value, at least one brightness value, and at least one address corresponding to the at least one LED unit 20. The LED module 23 includes LED beads having single color or having multiple colors.

Further, the LED module 21 is electrically connected through conductive wires, and the LED module 21 includes a Surface Mounted Devices (SMD) LED, a Dual In-Line (DIP) LED, or a Printed Circuit Board Assembly (PCBA) LED. For example, the conductive may be the positive power line 131 and the negative power line 132.

The LED string light using the PLC of the present invention is driven by a time-sharing technique. Therefore, when the processor module 12 transmits the data segments to the driver module 31, the LED module 33 is turned off, such that a current flowing through the LED module 33 can be decreased. Namely, a power line for connecting the LED unit is similar to an unloaded power line, and the data segments can be correctly transmitted. Moreover, since the power line only needs to maintain a minimum current for driving the driver module of the LED unit, an impact of data deformation or distortion caused by a current for driving loads, such as the LED module, can be minimized. Therefore, a limitation of a transmission distance caused by the PLC can be improved, or an amount of the at least one LED module can be increased. Moreover, since the length of the first time period corresponds to the data volume of the data segment, the data volume of the data segment can be determined for matching the visual persistence characteristic of the human eyes. Further, the duty cycle can be set as 50% for avoiding the visual light jitter caused by the time-sharing control.

In one embodiment, a chip model of the controller unit 10 is P9864T, data format of the controller unit 10 is 35 bits, and a duration for transmitting each bit is 3 μs.

For example, an amount of the LED units 20 is 1000.

In a conventional LED string light, a time period for transmitting data of one frame may be calculated as $3\times35\times1000=105000$ μs. Since the amount of the data of one frame is greater, the load of the LED units may be influenced, and the data may be deformed or distorted. The LED units after the $150^{th}$ LED unit may not correctly receive the control signal, and may stop normally functioning.

In the LED string light using the PLC of the present invention, the LED string light using the PLC divides the original data of the frame into 20 data segments. Each of the data segments includes data of 50 LED units. The time period for turning off the LED modules 23 is equal to the time period for turning on the LED modules 23. Namely, the duty cycle is 50%. In one period, half time of the period is used to receive the data segments, and the other half time of the period is used to display the content of the data of the frame.

Moreover, since the LED module 33 is turned off when the driver module 31 receives the control signal from the processor module 12, a power consumption of the LED string light using the PLC is low, and the data deformation may not be influenced. Therefore, a limitation of a transmission distance caused by the PLC can be improved. When the driver module 31 drives the LED module 33 according to the matched data stored in the buffer module 32, the processor module 12 stops transmitting data of the next frame, and the driver module 31 can generate a driving current to drive the LED module 33 according to a driving code corresponding to the matched data stored in the buffer module 32 for controlling a light color of the LED modules 33.

Since the controller unit 10 transmits the control signal when the LED module 30 is turned off, the data deformation is low. Therefore, the duration for transmitting each bit can be decreased from 3 μs to 1 μs, and an increased time period caused by the time-sharing technique can be compensated.

Figure 4A:
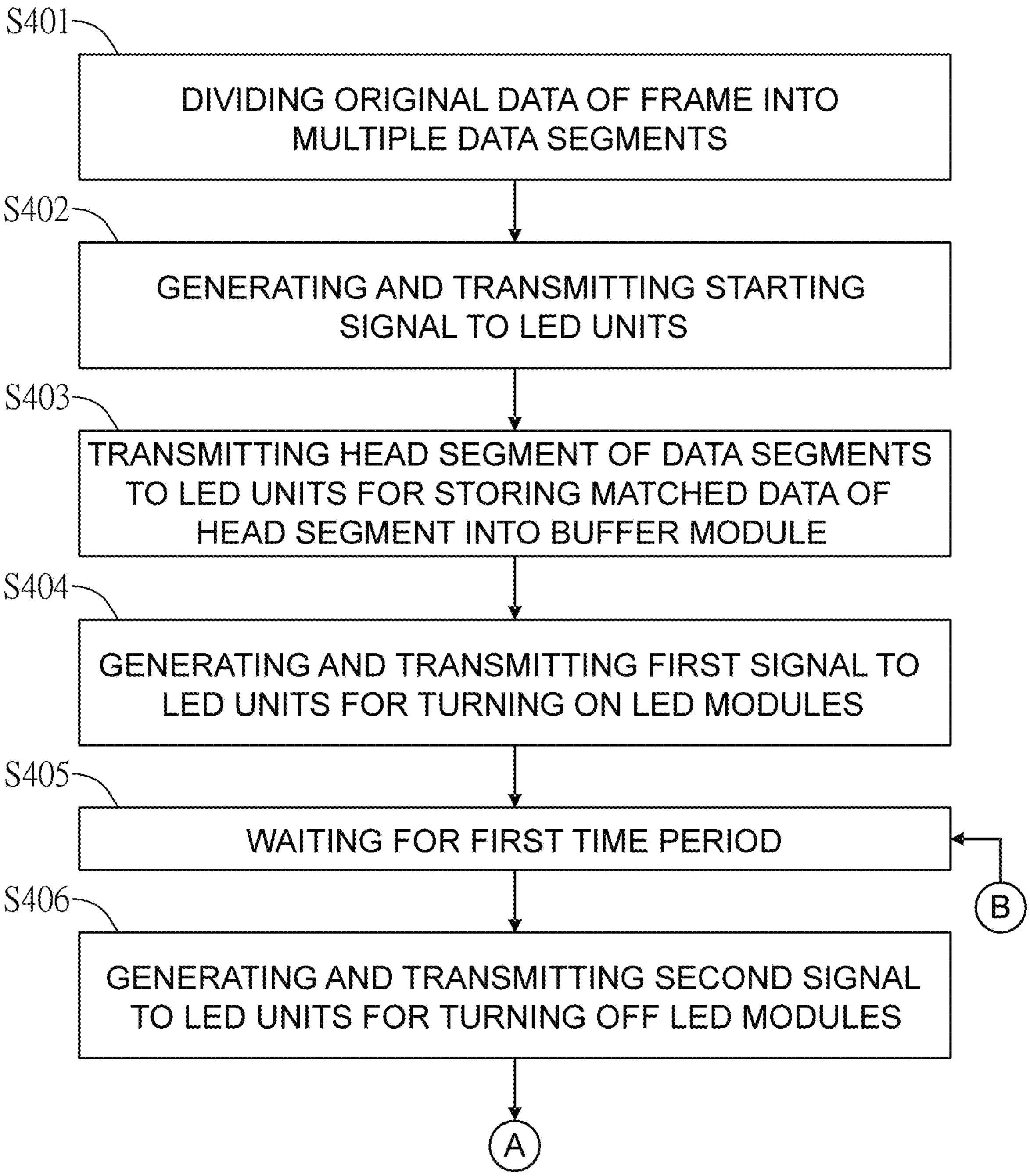
FIGS. 4A-4B are flowcharts of an LED string light controlling method using the PLC of the present invention.
Figure 4B:
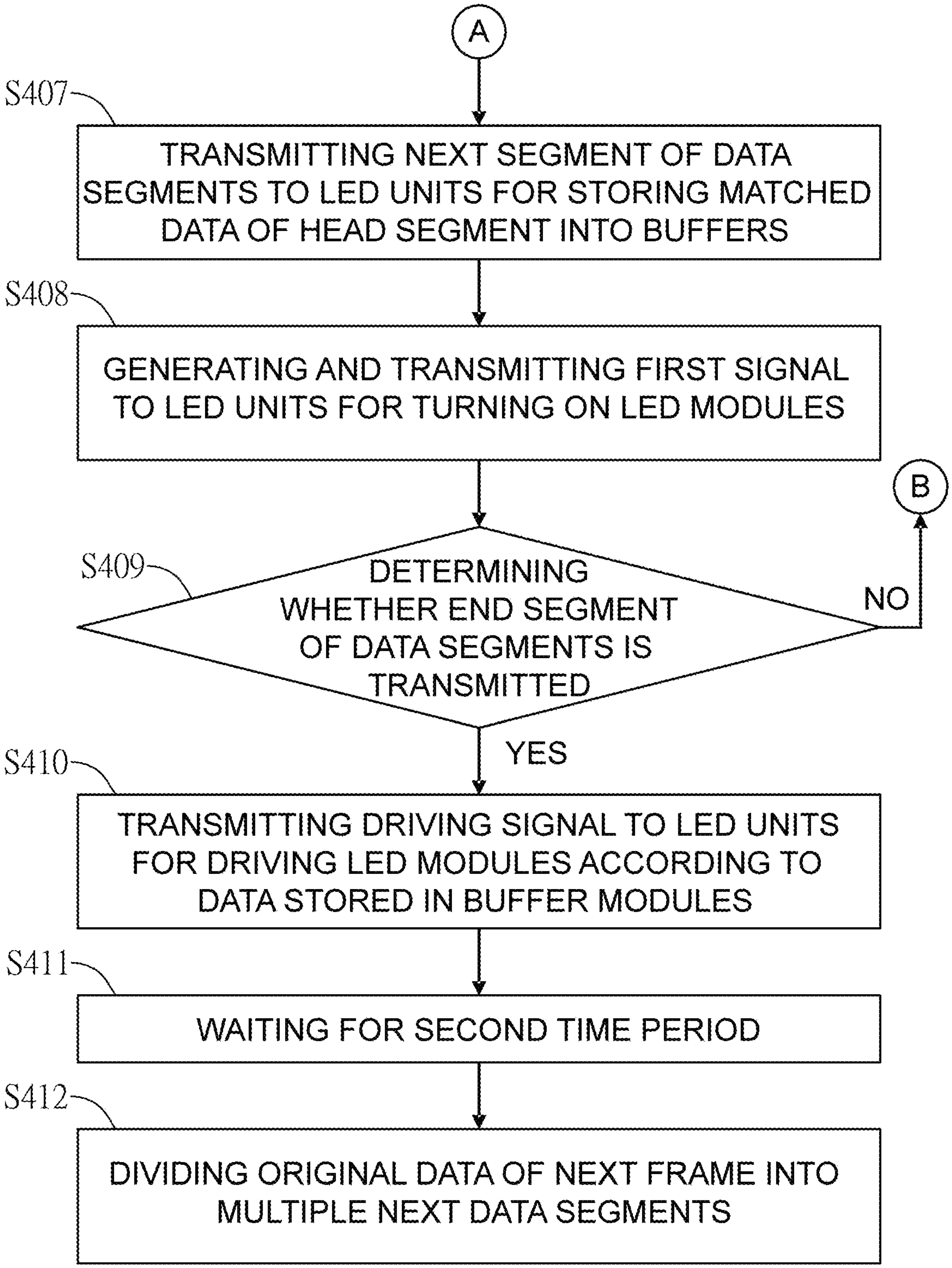

With reference to FIGS. 4A and 4B, the LED string light controlling method using the PLC includes steps of:

Step S401: dividing original data of a frame into multiple data segments;

Step S402: generating and transmitting a starting signal to LED units of the LED string light for turning off LED modules of the LED units;

Step S403: transmitting a head data segment of the data segments to the LED units for storing matched data of the head data segment into buffer modules of the LED units;

Step S404: generating and transmitting a first signal to the LED units for turning on the LED modules;

Step S405: waiting for a first time period;

Step S406: generating and transmitting a second signal to the LED units for turning off the LED modules;

Step S407: transmitting a next segment of the data segments to the LED units for storing matched data of the next segment into the buffer modules of the LED units;

Step S408: generating and transmitting the first signal to the LED units for turning on the LED modules;

Step S409: determining whether an end data segment of the data segments is transmitted;

Step S410: when the end data segment of the data segments is transmitted, transmitting a driving signal to the LED units for driving the LED modules according to the matched data stored in the buffer modules. 19

Step S411: waiting for a second time period;

Step S412: dividing original data of a next frame into multiple next data segments.

Figure 5A:
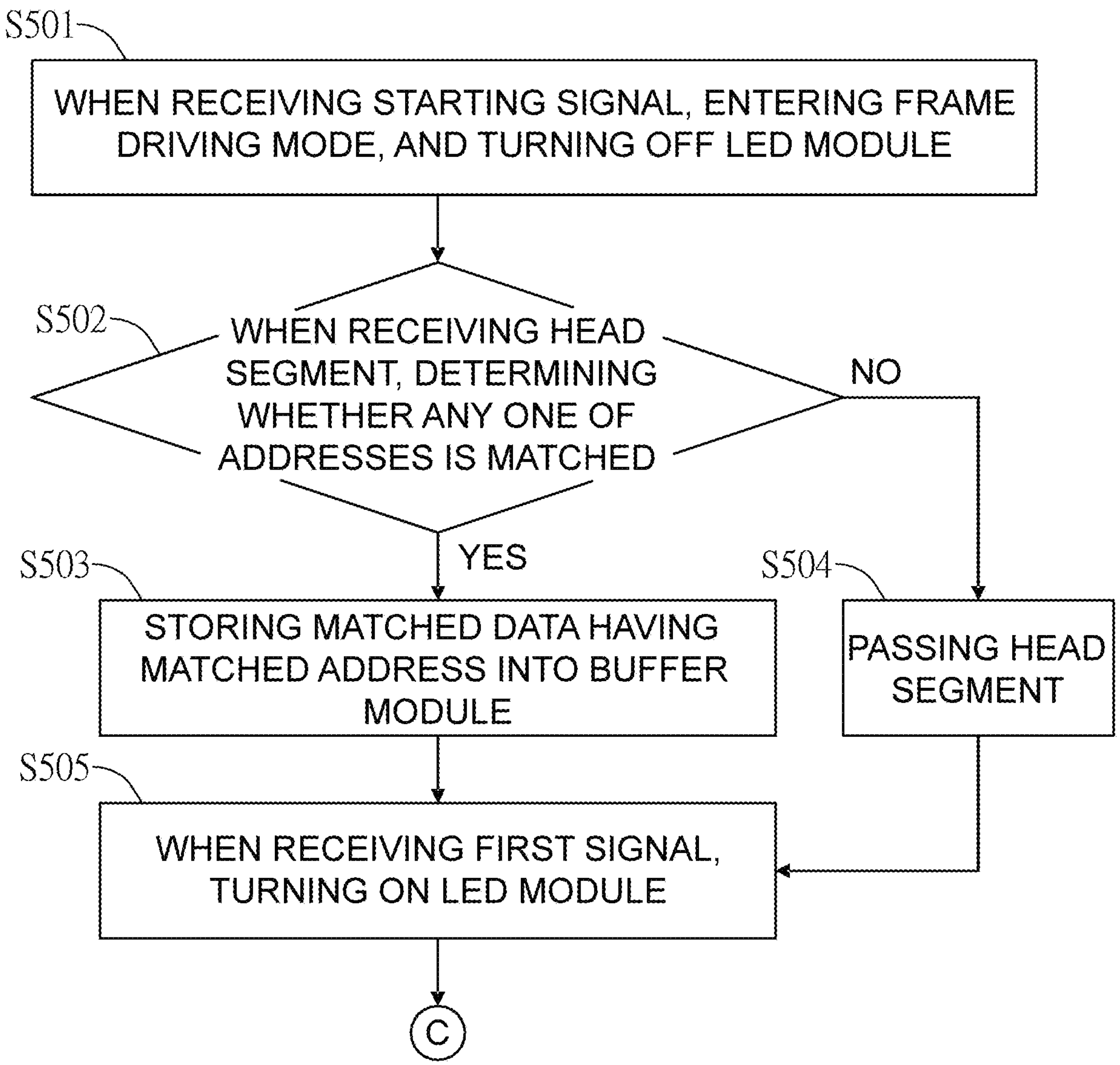
FIGS. 5A-5B are flowcharts of steps executed by the LED unit of the LED string light using the PLC of the present invention.
Figure 5B:
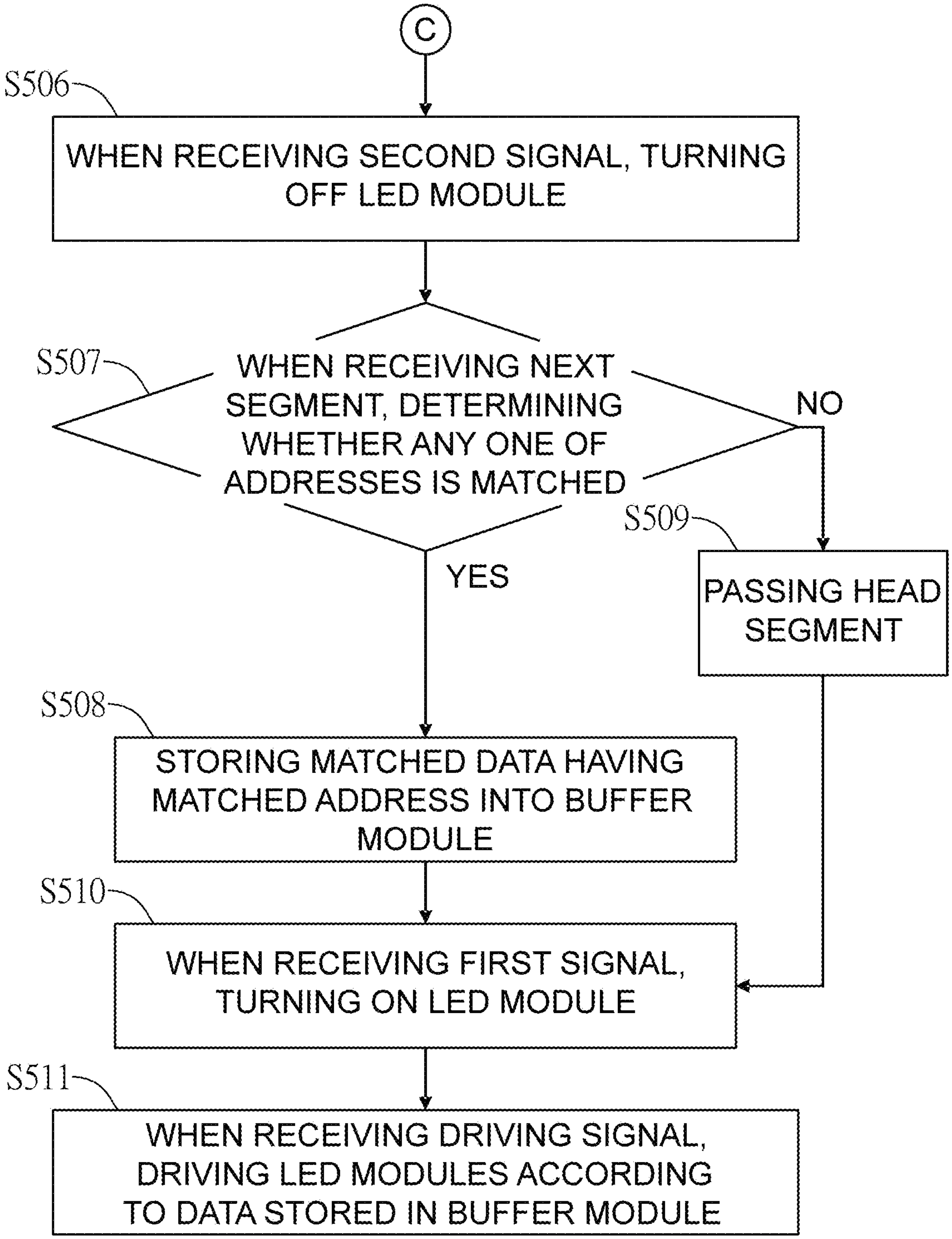

With reference to FIGS. 5A-5B, the driver module 31 of the LED unit 30 executes steps of:

Step S501: when receiving the starting signal, entering the frame driving mode, and turning off the LED module;

Step S502: when receiving the head data segment, determining whether any one of addresses of data in the head data segment is matched;

Step S503: when any one of the addresses of the data in the head data segment is matched, storing matched data having matched address into the buffer module;

Step S504: when none of the addresses of the data in the head data segment is matched, passing the head data segment;

Step S505: when receiving the first signal, turning on the LED module;

Step S506: when receiving the second signal, turning off the LED module;

Step S507: when receiving the next segment of the data segments, determining whether any one of the addresses of data in the next segment is matched;

Step S508: when any one of the addresses of the data in the next segment is matched, storing matched data having matched address into the buffer module;

Step S509: when none of the addresses of the data in the next segment is matched, passing the next segment;

Step S510: when receiving the first signal, turning on the LED module;

Step S511: when receiving the driving signal, driving the LED module according to the matched data stored in the buffer module.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A Light Emitting Diode (LED) string light controlling method using a power line communication (PLC), executed by a controller unit of an LED string light, and comprising steps of:

dividing original data of a frame into multiple data segments;

generating and transmitting a starting signal to LED units of the LED string light for turning off LED modules of the LED units;

transmitting a head data segment of the data segments to the LED units for storing matched data of the head data segment into buffer modules of the LED units;

generating and transmitting a first signal to the LED units for turning on the LED modules.

2. The LED string light controlling method as claimed in claim 1, further comprising steps of:

waiting for a first time period;

generating and transmitting a second signal to the LED units for turning off the LED modules;

transmitting a next segment of the data segments to the LED units for storing matched data of the next segment into the buffer modules of the LED units;

generating and transmitting the first signal to the LED units for turning on the LED modules;

determining whether an end data segment of the data segments is transmitted;

when the end data segment of the data segments is transmitted, transmitting a driving signal to the LED units for driving the LED modules according to the matched data stored in the buffer modules.

3. The LED string light controlling method as claimed in claim 2, further comprising steps of:

waiting for a second time period;

dividing original data of a next frame into multiple next data segments.

4. The LED string light controlling method as claimed in claim 1, wherein the data segments comprise color values, brightness values, and addresses corresponding to the LED units.

5. An LED string light using a PLC, comprising:

a controller unit, comprising:

a memory module, storing at least one frame;

a processor module, electrically connected to the memory module, and loading the at least one frame stored in the memory module;

a power module, electrically connected to the processor module;

at least one LED unit, comprising:

a buffer module, electrically connected to the power module;

a driver module, electrically connected to the buffer module;

an LED module, electrically connected to the driver module;

wherein the processor module divides original data of a frame into multiple data segments, and generates and transmits a starting signal to the driver module;

wherein when the driver module receives the starting signal, the driver module enters a frame driving mode, and the driver module turns off the LED module;

wherein after the processor module transmits the starting signal to the driver module, the processor module transmits a head data segment of the data segments to the driver module, and when the driver module receives the head data segment, the driver module determines whether any one of addresses of data in the head data segment is matched;

wherein when any one of the addresses of the data in the head data segment is matched, the driver module stores matched data having matched address into the buffer module;

wherein after the processor module transmits the head data segment of the data segments to the driver module, the processor module generates and transmits a first signal to the driver module, and when the driver module receives the first signal, the driver module turns on the LED module.

6. The LED string light as claimed in claim 5, wherein when none of the addresses of the data in the head data segment is matched, the driver module passes the head data segment.

7. The LED string light as claimed in claim 5, wherein after the processor module transmits the first signal to the driver module, the processor module waits for a first time period;

wherein after the processor module waits for the first time period, the processor module generates and transmits a second signal to the driver module, and when the driver module receives the second signal, the driver module turns off the LED module;

wherein after the processor module transmits the second signal to the driver module, the processor module transmits a next segment of the data segments to the driver module, and when the driver module receives the next segment of the data segments, the driver module determines whether any one of the addresses of data in the next segment is matched;

wherein when any one of the addresses of the data in the next segment is matched, the driver module stores matched data having matched address into the buffer module;

wherein after the processor module transmits the next segment of the data segments to the driver module, the processor module generates and transmits the first signal to the driver module, and when the driver module receives the first signal, the driver module turns on the LED module;

wherein after the processor module transmits the second signal to the driver module, the processor module determines whether an end data segment of the data segments is transmitted;

wherein when the end data segment of the data segments is transmitted, the processor module transmits a driving signal to the driver module, and when the driver module receives the driving signal, the driver module drives the LED module according to the matched data stored in the buffer module.

8. The LED string light as claimed in claim 7, wherein when none of the addresses of the data in the next segment is matched, the driver module passes the next segment.

9. The LED string light as claimed in claim 7, wherein after the processor module transmits the driving signal to the driver module, the processor module waits for a second time period, and further divides original data of a next frame into multiple next data segments.

10. The LED string light as claimed in claim 5, wherein the data segments comprise at least one color value, at least one brightness value, and at least one address corresponding to the at least one LED unit.

11. The LED string light as claimed in claim 5, wherein the LED module comprises LED beads having one single color or having multiple colors.

12. The LED string light as claimed in claim 11, wherein the LED beads having multiple colors comprise at least one red color LED bead, at least one green color LED bead, at least one blue color LED bead, and at least one white color LED bead.

13. The LED string light as claimed in claim 11, wherein the LED beads having multiple colors comprise at least one red color LED bead, at least one green color LED bead, and at least one blue color LED bead.

14. The LED string light as claimed in claim 5, wherein the LED module is electrically connected through conducive wires, and the LED module comprises a Surface Mounted Devices (SMD) LED, a Dual In-Line (DIP) LED, or a Printed Circuit Board Assembly (PCBA) LED.

* * * * *